United States Patent [19]

Zulu

[11] Patent Number: 5,396,768

[45] Date of Patent: Mar. 14, 1995

[54] GEARLESS HYDRO-MECHANICAL TRANSMISSION

[75] Inventor: Joshua Zulu, Chillicothe, Ill.

[73] Assignee: Caterpillar Inc., Peoria, Ill.

[21] Appl. No.: 179,211

[22] Filed: Jan. 10, 1994

[51] Int. Cl.[6] ............................................. F16D 39/00
[52] U.S. Cl. ....................................... 60/487; 91/484
[58] Field of Search .................... 91/484, 485; 60/487

[56] References Cited

U.S. PATENT DOCUMENTS

| | | | |
|---|---|---|---|
| 2,257,792 | 10/1941 | Fletcher | 60/487 |
| 2,608,933 | 9/1952 | Ferris | 91/484 |
| 3,131,539 | 5/1964 | Creighton et al. | 60/487 |
| 3,133,418 | 5/1964 | Froebe | 60/487 |
| 3,155,010 | 11/1964 | Johnson et al. | 91/485 |
| 3,190,074 | 6/1965 | Johns | |
| 3,586,052 | 6/1971 | Abe et al. | 91/484 |
| 3,643,434 | 2/1972 | Widmaier | |
| 3,702,143 | 11/1972 | Van Wagenen et al. | 91/485 |
| 3,905,251 | 9/1975 | Greene | |
| 4,794,756 | 1/1989 | Iseman | 60/489 |

Primary Examiner—F. Daniel Lopez
Attorney, Agent, or Firm—O. Gordon Pence

[57] ABSTRACT

A hydro-mechanical transmission 10 having fluid motor 48 that is entirely rotatable to eliminate the need for separate gearing is disclosed. The gearless hydro-mechanical transmission 10 provides a variable speed and torque output from an external mechanical power source 14 and an external hydraulic power source 20. The hydro-mechanical transmission 10 comprises a stationary case 42, an output shaft 44 mounted within the case for rotation about a central axis 52, a mechanical input 46 mounted in coaxial alignment with the output shaft 44 for rotation about the central axis 52 with the input 46 being connected to and rotatable driven by the mechanical power source 14, a rotatable hydraulic motor 48 having a drive unit 60 for rotatably driving a driven unit 62 with the driven unit 62 being coupled to drive the output shaft 44, and means 100 for conducting pressurized hydraulic fluid from the hydraulic power source 20 to the hydraulic motor 48 for driving the driven unit 62 of the hydraulic motor 48 by the drive unit 60.

8 Claims, 6 Drawing Sheets

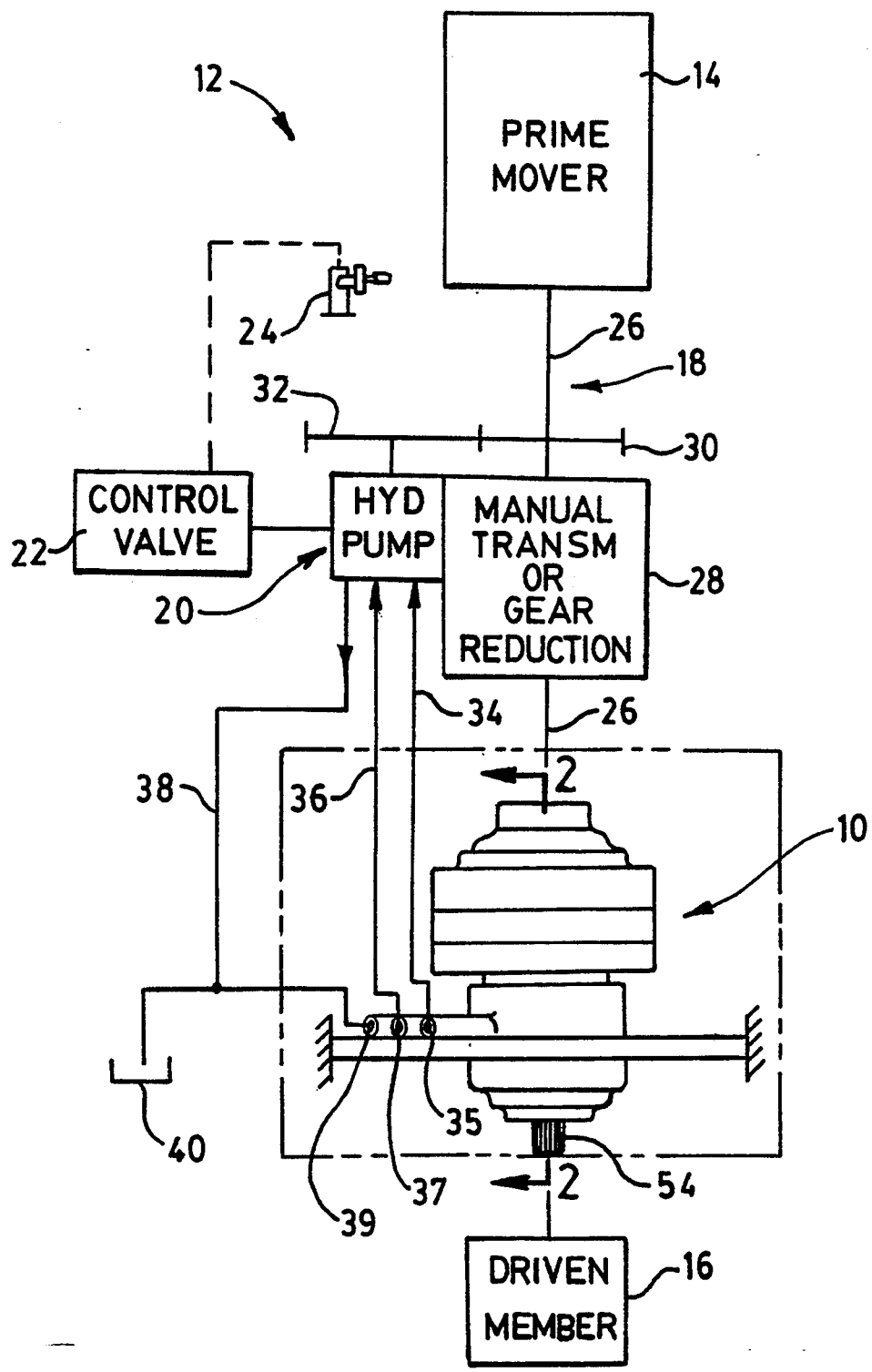

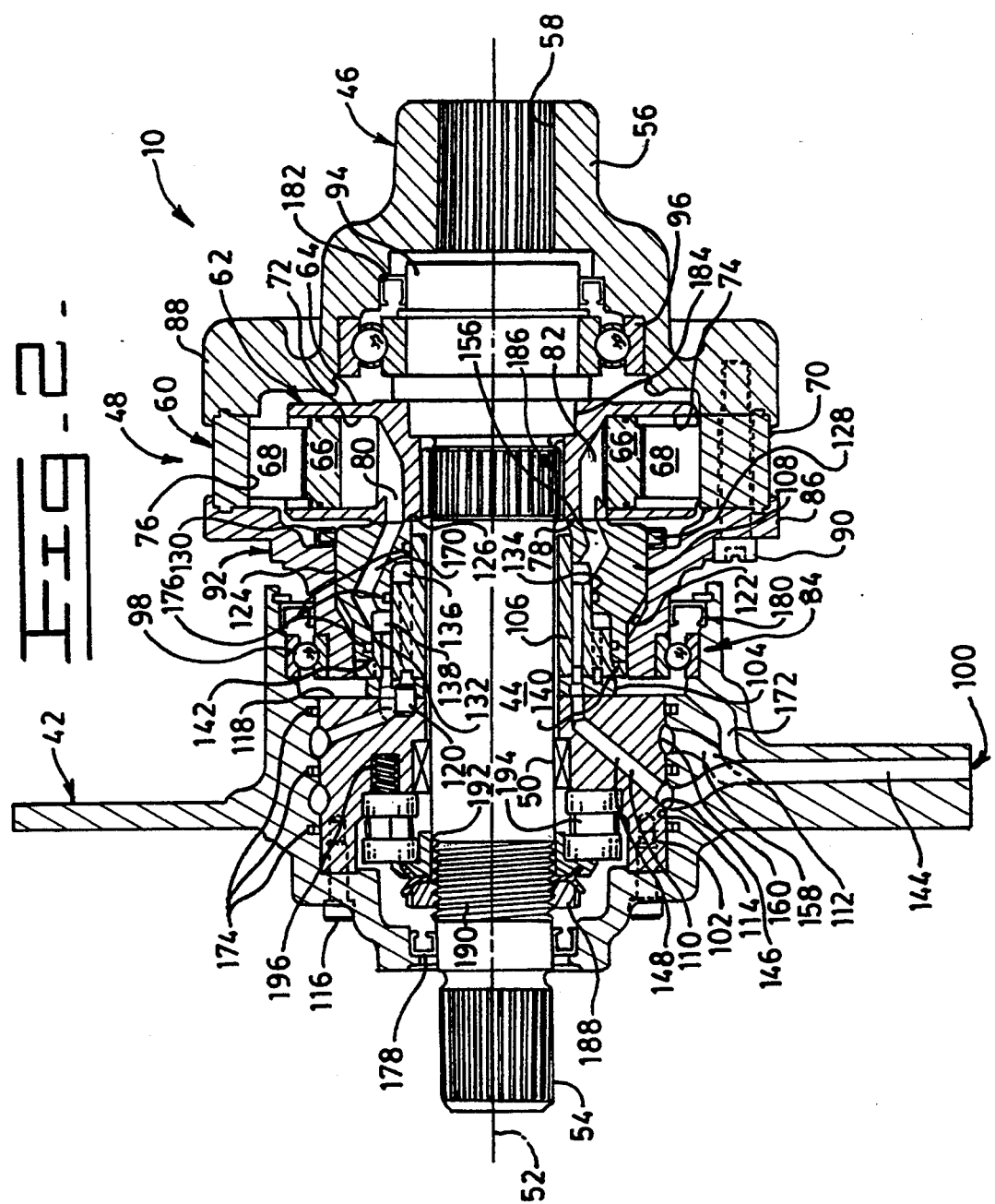

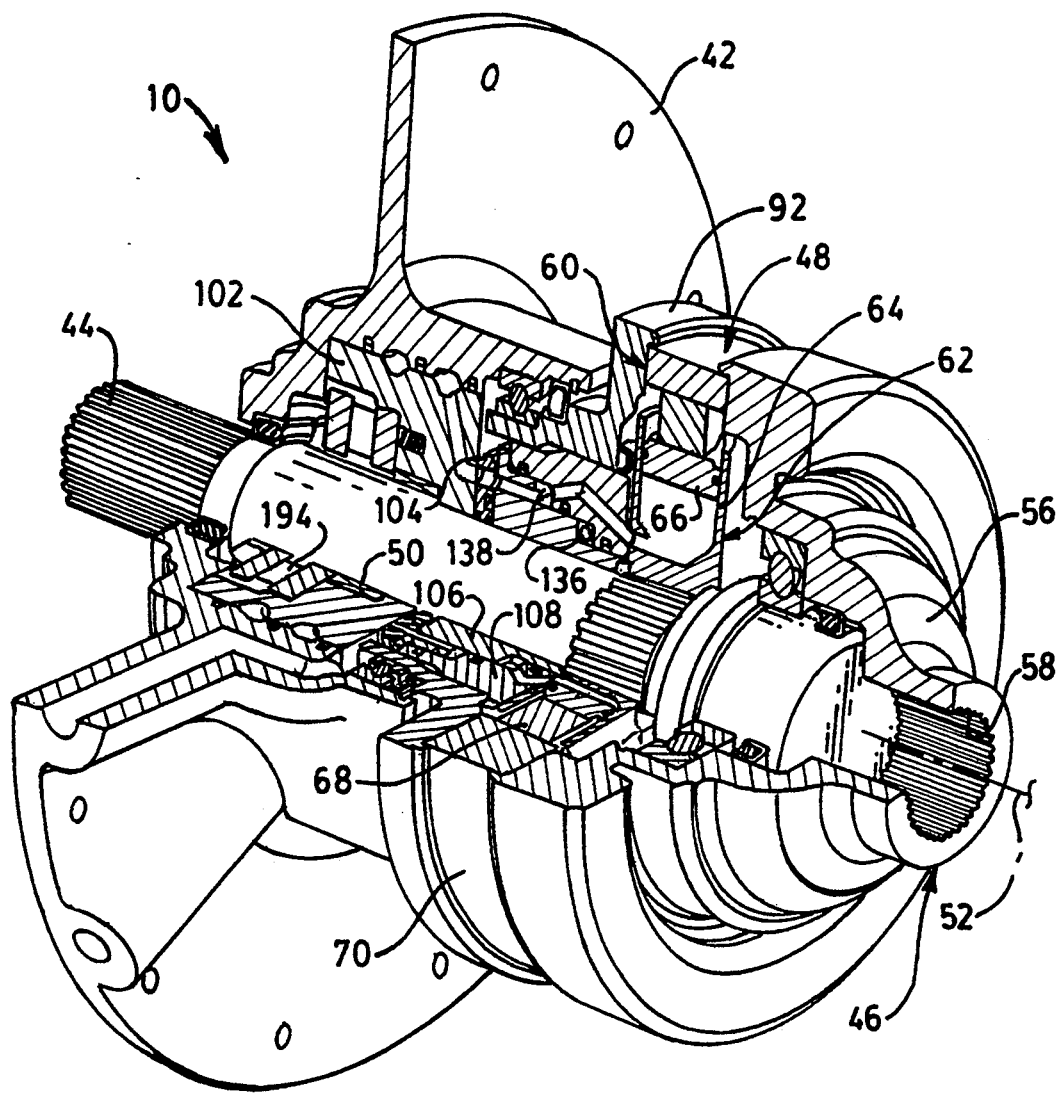

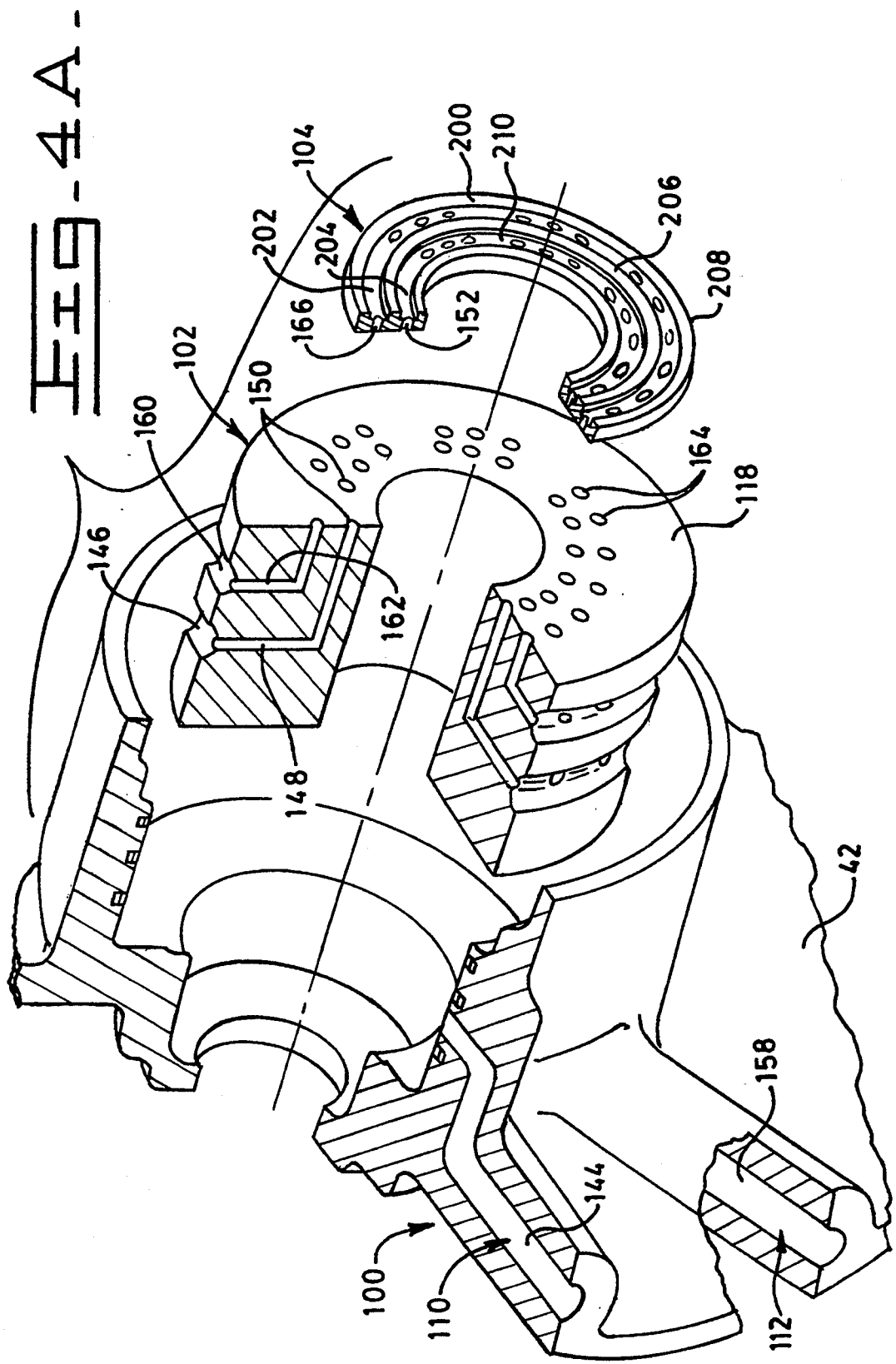

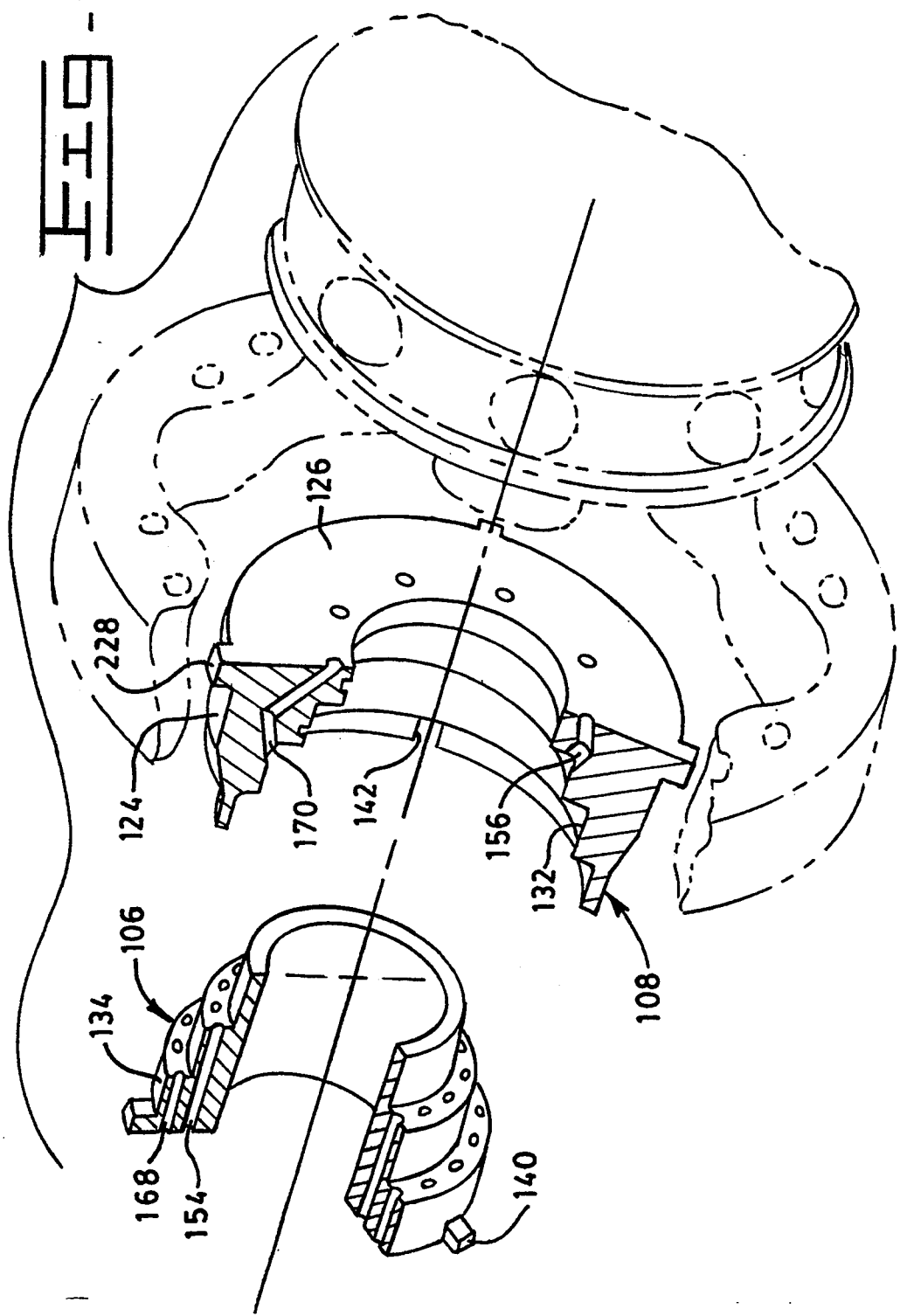

GEARLESS HYDRO-MECHANICAL TRANSMISSION

TECHNICAL FIELD

The present invention generally relates to hydromechanical transmission apparatus and more particularly to a hydro-mechanical transmission having fluid motor that is entirely rotatable to eliminate the need for separate gearing.

BACKGROUND ART

Various hydro-mechanical transmission arrangements known in the art have been proposed for use in vehicles and the like as the primary variable speed transmission. Such arrangements may also be employed as steering mechanism for track-type tractors. For example, a hydro-mechanical variable ratio transmission is disclosed in U.S. Pat. No. 3,905,251 issued Sep. 16, 1975 to Clarence Kirk Greene. This transmission utilizes either a planetary gear mechanism or a bevel gear type differential mechanism to combine the mechanical and hydraulic inputs. While an in-line motor is disclosed in one embodiment of this patent, such motor is not revolvable, thus necessitating the use of separate gearing, adding to the complexity and cost and preventing compactness of the unit.

An in-line hydro-mechanical transmission is disclosed in U.S. Pat. No. 3,190,074, issued Jan. 22, 1965 to S. S. Johns. This transmission has a revolvable mechanism containing a charging pump, a main pump and a fluid motor. As the pump is integral with the transmission, rather than being remote, the system is extremely complex and requires a mechanical connection to the pump rotor for changing the speed or power ratio of the transmission. Incorporation of the main and charging pumps into the transmission also increases the size of the entire unit, making its use impractical where available space is at a minimum. Also, the vane type of pump and motor construction disclosed is not compatible with radial or axial piston motor designs.

In U.S. Pat. No. 3,643,434, issued Feb. 22, 1972 to Dieter Widmaier, a dual hydraulic unit is disclosed which can be used as a double pump or double motor, or as a hydrostatic transmission. Here, as in the preceding prior art device, the dual pump/motor arrangement makes the unit large and complex. Further, such dual device does not provide a gearless transmission with separate mechanical and hydraulic inputs and a combined output. Also, the dual axial piston pump/motor design is not fully compatible to a radial piston motor design.

DISCLOSURE OF THE INVENTION

In accordance with one aspect of the present invention, there is provided a gearless hydro-mechanical transmission for providing a variable speed and torque output from an external mechanical power source and an external hydraulic power source. The hydromechanical transmission comprises a stationary case, an output shaft mounted within the case for rotation about a central axis, a mechanical input mounted in coaxial alignment with the output shaft for rotation about the central axis with the input being connected to and rotatable driven by the mechanical power source, a rotatable hydraulic motor having a drive unit for rotatably driving a driven unit with the driven unit being coupled to drive the output shaft, and means for conducting pressurized hydraulic fluid from the hydraulic power source to the hydraulic motor for driving the driven unit of the hydraulic motor by the drive unit.

In accordance with another aspect of the present invention, a power unit is provided having a primary power source, a hydraulic power source powered by the primary power source and a gearless hydromechanical transmission for powering a driven member. The hydromechanical transmission comprises a rotatably mounted mechanical input powered by the primary source of power, a rotatably mounted hydraulic motor powered by the hydraulic power source, and a rotatably mounted combined output for powering the driven member at variable speeds and torques. The hydraulic motor has a drive unit for hydraulically driving a driven unit. The drive and driven units are rotatable relative to each other about a central axis. The mechanical input is coupled to the drive unit for mechanically rotatably driving the drive unit about the central axis. The combined output is coupled to and driven by the driven unit of the motor about the central axis, whereby the hydraulic motor, mechanical input and combined output are all disposed in-line with each other along the central axis.

BRIEF DESCRIPTION OF THE DRAWINGS

FIG. 1 is a schematic view of a power unit with a hydro-mechanical transmission embodying the principles of the present invention;

FIG. 2 is an enlarged cross-sectional view of the hydro-mechanical transmission taken along line 2—2 of FIG. 1;

FIG. 3 is a perspective view of the view of the hydromechanical transmission shown in FIG. 2, with a portion broken away and shown in section;

FIG. 4A is an exploded perspective view of the left-hand portion of the hydro-mechanical transmission shown in FIG. 3;

FIG. 4B is an exploded perspective view of the right-hand portion of the hydro-mechanical transmission shown in FIG. 3, with some components shown in solid lines and others in phantom lines to permit understanding of the solid line components.

BEST MODE FOR CARRYING OUT THE INVENTION

Figure 5:
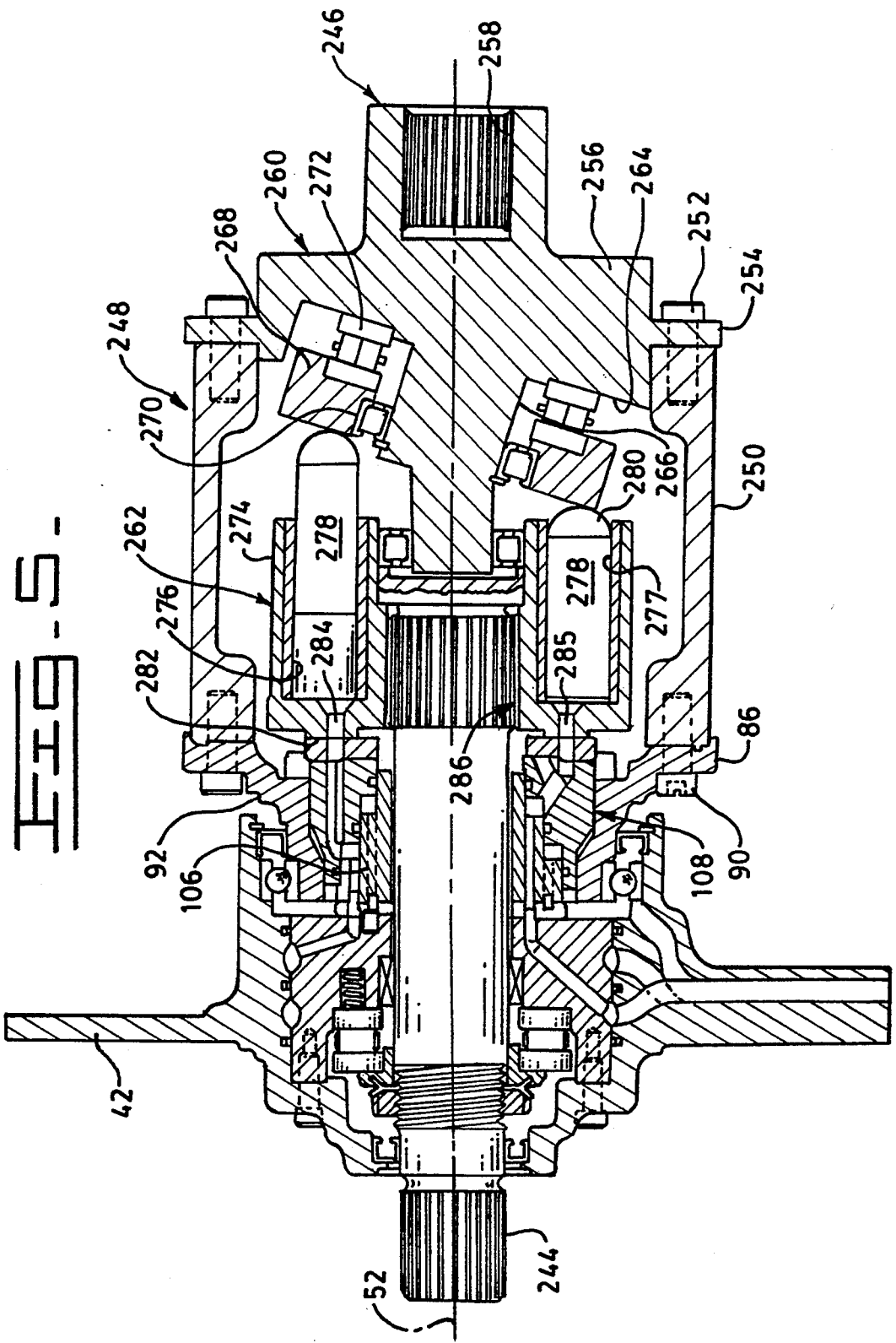
FIG. 5 is a cross-sectional view, similar to FIG. 2, but illustrating an alternate embodiment of the hydromechanical transmission.

Referring more particularly to the drawings, a hydromechanical transmission embodying the principles of the present invention is generally indicated at 10 in FIG. 1 for use in a power unit 12. Such power unit 12 may be of any well known configuration, but for illustrative purposes is depicted in FIG. 1 as including a primary source of power, such as an internal combustion engine or other prime mover 14, a driven member 16, and a drive train 18 for coupling the prime mover 14 to the driven member 16. The power unit also includes a hydraulic source of power in the form of a variable displacement hydraulic pump 20, which can be of any well-known construction. The pump 20 may be controlled through a conventional valve 22 operated by a manual control lever 24, as well known in the art.

The drive train 18 includes a drive shaft 26 to interconnect the engine 14 to the hydro-mechanical transmission 10. Depending on the particular application in which the power unit 12 is to be used, the drive train 18 may, but is not required to, include a conventional mechanical transmission or gear reduction unit 28 that is interposed in the drive train 18 between the engine and the hydro-mechanical transmission 10. The drive train 18 also preferably includes a set of gears for powering the pump 20, the first gear 30 being coupled to and driven by the drive shaft 26 and meshing with a second gear 32, which is coupled to the pump 20.

A first hydraulic line 34 connects the pump 20 to a first port 35 of the hydro-mechanical transmission 10. Likewise, a second hydraulic line 36 connects the pump 20 to a second port 37. A third hydraulic line 38 preferable connects the transmission 10 and pump 20 to tank 40.

As shown in FIGS. 2 & 3, the hydro-mechanical transmission 10 includes a stationary case 42, an output shaft 44, a mechanical input 46 and a rotatable hydraulic motor 48. The output shaft 44 is rotatably mounted within the case by a suitable bearing 50 for rotation about a central axis 52 and has a splined end 54 protruding from the case 42 for use in coupling the shaft 44 to the driven member 16. The mechanical input 46 comprises an annular hub 56 having an internal spline 58 at its distal end for use in coupling the input to the drive shaft 26.

In the embodiment depicted in FIGS. 2 and 3, the motor 48 is of a low speed, high torque radial piston type. It should be understood that the present invention is not intended to be limited to a particular motor type, as those skilled in the art will readily be able to adapt to the types of motors based upon and without departing from the teachings hereof.

The motor 48 may also be of any well-known construction and its operation is well understood by those skilled in the art. For sake of clarity of understanding and comparison between this embodiment and the embodiment depicted in FIG. 5, the motor 48 is described as having a drive unit 60 and a driven unit 62. In FIG. 2, the driven unit 62 comprises a cylinder block 64, pistons 66 and cylindrical rollers 68. The drive unit 60 comprises a cam plate 70. The cylinder block 64 has a plurality of radially disposed cylinders therein, one depicted by reference number 72 and another depicted by reference number 74. One of the pistons 66 is reciprocatably disposed in each cylinder 72, 74. The cam plate 70 is disposed about the cylinder block 64 and is provided with a suitable inner cam surface 76. Each piston 66 is provided with one of the cylindrical rollers 68 for rolling contact with the cam surface 76 of the cam plate 70. The cylinder block 64 is also provided with a plurality of fluid ports that extend from a radial port face 78 to each of the of cylinders, one of such ports being shown at 80 for cylinder 72 and another being shown at 82 for cylinder 74 in FIG. 2.

The hydro-mechanical transmission 10 also includes means 84 for rotatably supporting the hydraulic motor 48 to permit the rotation of the motor 48 relative to the stationary case 42 about the central axis 52. Rotatable support of the motor 48 is accomplished as follows. The cam plate 70 of the motor is mounted between flanges 86 and 88 and retained by bolts 90. Flange 86 is provided on a distributor housing 92, while flange 88 is provided on the hub 56 of the mechanical input 46. The hub 56 is rotatably mounted about an enlarged end 94 of the output shaft 44 by a suitable bearing 96. The distributor housing 92 is rotatably mounted to the stationary case by a second bearing 98.

The hydro-mechanical transmission 10 further includes means 100 for conducting pressurized hydraulic fluid from the hydraulic power source 20 to the hydraulic motor 48 to effect the driving of the driven unit 62 of the hydraulic motor 48 by the drive unit 60. Such means 100 for conducting fluid includes a pressure manifold 102, an annular port plate 104, an annular pressure force manifold 106, a distributor valve 108, and first and second passage means 110, 112.

The pressure manifold 102 is carried by the stationary case 42 by being disposed within a suitable bore 114 of the case and retained therein by bolts 116. The port plate 104 is carried by the pressure manifold 102 by mounting to an end face 118 of the manifold and retained thereto by dowel pins 120. The distributor valve 108 is carried by and rotatable with the mechanical input 46 and drive unit 60 of the hydraulic motor 48. This is accomplished by a stepped bore 122 in the distributor housing 92 and a mating stepped surface 124 on the periphery of the distributor valve 108. The mating stepped surface 124 of the valve is adapted to be slidably received within the stepped bore 122 of the housing 92 to permit relative axial movement therebetween so as to permit contact of a mating end face 126 of the valve with the port face 78 on the cylinder block 64 of the motor 48. Relative rotation between the distributor valve 108 and the housing 92 is prevented by a radially extending key 128 on the valve 108 that extends into a mating notch 130 provided in the housing 92.

The pressure force manifold 106 is carried within the valve as follows. The distributor valve 108 is provided with a double stepped annular opening 132 therethrough. The pressure force manifold 106 is provided with a mating double stepped outer periphery 134 that is slidably received within the stepped opening 132 of the valve 108. The valve 108 and manifold 106 are of suitable construction to provide a pair of pressure chambers 136, 138 between the steps. Relative rotation between the pressure force manifold 106 and the distributor valve 108 is prevented by a radially extending key 140 at the end of the manifold which extends into a mating notch 142 in the distributor valve.

The first and second passage means 110, 112 are each separately disposed through the case 42, pressure manifold 102, port plate 104, pressure force manifold 106 and distributor valve 108 to separately conduct fluid from the first and second inlet/outlet ports 35, 37, respectively, to ports 80, 82 of the hydraulic motor As best seen in FIGS. 4A and 4B, first passage means 110 includes as follows: A radial passage 144 through the case 42 communicating with a first peripheral groove 146 about the pressure manifold 102, the first groove 146 communicates with a first plurality of passages 148 terminating at an inner set of openings 150 at the face 118 of the manifold 102 in contact with the port plate 104. Such inner set of openings communicate with a mating set of inner passages 152 through the port plate 104. The inner passages 152 of the port plate 104 communicate with a similar set of inner passages 154 through the pressure force manifold 106. Such inner passages 154 communicate with the inner pressure chamber 136 between the pressure force manifold 106 and the distributor valve 108. The inner pressure chamber 136 communicates with a first set of passages 156 through the distributor valve 108 which communicate with certain ones of the ports 80, 82 of the cylinder block 64, as will hereinafter be more fully described.

Likewise the second passage means 112 includes as follows: A second radial passage 158 through the case 42 communicating with a second peripheral groove 160 about the pressure manifold 102, the second groove 160 communicates with a second plurality of passages 162 terminating at an outer set of openings 164 at the face of the manifold in contact with the port plate 104. Such outer set of openings 164 communicate with a mating set of outer passages 166 through the port plate 104. The outer passages 166 of the port plate 104 communicate with a similar set of outer passages 168 through the pressure manifold. Such outer passages 168 communicate with the outer pressure chamber 138 between the pressure force manifold 106 and the distributor valve 108. The outer pressure chamber 138 communicates with a second set of passages 170 through the distributor valve 108 which communicate with certain other ones of ports of the cylinder block. The third or drain port 39 communicates through a third passage 172 (FIG. 2) with the interior of the case 42 for draining off any fluid leakage from within the case.

As also depicted in FIG. 2, a first set of suitable seals 174 are provided on opposite sides of the grooves 146, 160 and passages 144, 158 to prevent fluid leakage between the case 48 and the manifold 102. Likewise, a second set of suitable seals 176 are provided between the mating stepped periphery between the distributor valve 108 and the pressure force manifold 106 to similarly prevent fluid leakage therebetween.

The entire assemblage is preferably sealed by suitable seals, such as a seal 178 between the case 42 and output shaft 44, a seal 180 between the case 42 and the distributor housing, and a seal 182 between the hub 56 and the enlarged end of the output shaft 44.

As depicted in FIG. 2, the cylinder block 64 is supported on and axially abuts a stepped shoulder 184 on the output shaft 44. The block 64 and shaft 44 are rotatably coupled together by a spline connection at 186. A nut 188 mounted on a threaded portion 190 of the shaft 44 abuts a bearing carrier 192. A thrust bearing 194 is interposed between the carrier 192 and the manifold 102. A plurality of axial pre-load springs, one of which is shown at 196, may be employed to assist in maintaining the axial sealing faces engaged.

An alternate embodiment of the present invention is shown in FIG. 5. It should be noted that many of the components depicted in FIG. 5, particularly on the left hand side from the case 42 to the pressure force manifold 106, are identical with those depicted in the previous embodiment. The distributor valve 108 is basically the same, but may have somewhat different porting to accommodate the design of the axial piston pump, rather than that of the radial piston pump. Such components are provided with the same numbers and, for sake of brevity, will not be further described, except in connection with the new components hereinafter described. The embodiment of the hydro-mechanical transmission depicted in FIG. 5 generally functions in the same manner as the previous embodiment, but instead of the use of a radial piston motor 48 described earlier, the FIG. 5 embodiment employs an axial piston motor 248.

The axial piston motor 248 similarly includes a drive unit 260 and a driven unit 262. The drive unit 260 is comprised of an input hub 256 and a cylindrical casing 250. The casing 250 is mounted by bolts 90 to the flange 86 of the distributor housing 92. The other end of the casing 250 is similarly attached to a flange 254 of the hub 256 by bolts 252. The hub 256 is provided with a suitable splined bore 258 for coupling the hub 256 to the drive shaft 26 (not shown). The hub has an angled interior side portion 264. An angled support shaft 266 extends from the interior side portion 264 of the hub. An annular swash plate 268 is disposed about and rotatably mounted to the support shaft 266 by roller bearing 270 so as to rotate at an angle relative to the central axis 52. The swash plate 268 is also supported by a thrust bearing 272 between it and the angled side portion 264. The driven unit 262 is comprised of an annular cylinder block 274 having a plurality of lined, axially oriented cylinders 276 and a like plurality of pistons 278 reciprocatably mounted within such cylinders. The pistons 278 have rounded ends 280 for rocking contact with the swash plate. The cylinder block 274 is also provided with a like plurality of fluid ports that extend from a radial port face 282 to each of the of cylinders, one of such ports being shown at 284 for cylinder 276 and another being shown at 285 for cylinder 277. The cylinder block 274 is rotatably coupled to the output shaft 244 by a spline connection 286.

INDUSTRIAL APPLICABILITY

The hydro-mechanical transmission 10 constructed in accordance with the teachings of the present invention advantageously provides a variable speed and torque output from an external mechanical power source 12 and an external hydraulic power 20 source in a simple, compact package and without the use of gearing.

Those skilled in the art will understand that in the operation of the motor 48, 248, pistons 68, 278 in certain cylinders 74, 276 will be on an expansion stroke when fluid is being directed thereto, while the pistons 48, 248 in the other cylinders 74, 277 will be on a contraction stroke when fluid is being exhausted therefrom. The function of the distributor valve 108 is to selectively time the communication of fluid from either the first port 35 or the second port 37 to the cylinder ports 80, 82 & 284, 285 in response to the relative rotational position of the cylinder block 64, 274 with the cam plate 70 or swash plate 268, as known in the art. This is accomplished by arranging the passages 156, 170 through the distributor valve 108 so that they align with certain cylinder ports 80, 82 & 284, 285 depending on the relative rotational position of the distributor valve 108 with the cylinder block 64, 274 as the cylinder block rotates relative to distributor valve 108 in operation.

However because the entire motor 48, 248 rotates as well, fluid must be communicated to the distributor valve 108 as it rotates relative to the stationary case 42. This is accomplished by the utilization of the port plate 104. As best seen in FIG. 4A, port plate 104 has a radial face 200 having an annular inner groove 202 and an annular outer groove 204. The grooves 202, 204 are separated by a sealing land 206. A separate outer sealing land 208 surrounds the outer groove 204 and separate inner sealing land 210 lies internally of the inner groove 202. Such lands 206, 208, 210 are disposed in sealing contact with mating lands (not shown) on the pressure force manifold 106. The respective lands are maintained in metal-to-metal face sealing contact with each other during operation by fluid pressure in the pressure chambers 136, 138 that generate an axial force when pressurized fluid is present in such chambers for urging the sealing face of the pressure force manifold 106 into sealing contact with the mating face 200 of the port plate 104, as well as the contacting port faces 78, 282, 126 of the cylinder block 64, 274 and the distributor valve 108.

With an understanding of the method of fluid distribution, it can readily be seen that the driven unit 62, 262 is driven in one direction relative to the drive unit 60, 62 when pressurized fluid is directed to the first port 35, the driven unit 62, 262 is driven in an opposite direction when pressurized fluid is directed to the second port 37, and the drive and driven units are locked relative to each other when pressurized fluid is blocked from escaping from both of the first and second ports 35, 37. Fluid is selectively directed to the first 35 and second 37 ports from the pump 20 by the control valve 22 through manual manipulation of the hand lever 24, as well known in the art.

Because the drive unit 60, 260 of the motor 48, 248 is coupled to rotate with the mechanical input 46, 246 and the driven unit 62, 262 is coupled to rotate with the output shaft 44, 244, the following drive combinations will result. The output shaft 44, 244 will turn at the same speed as the input 46, 246 when pressurized fluid is blocked to the first and second ports 35, 37. Assuming, for instance, that the mechanical input 42, 246 rotates the drive unit in a clockwise direction, as view in FIG. 3, and the driven unit 62, 262 is also driven in a clockwise direction when fluid pressure is directed to the first port 35, the output shaft 44, 244 will turn at a speed equal to the sum of the speeds of the input 46, 246 and motor 48, 248. Conversely, if the driven unit 62, 262 of the motor 48, 248 is driven in a counterclockwise direction, as when fluid is directed to the second port 37, the output shaft 44, 244 will turn at a speed equal to the difference between the speeds of the input 46, 246 and the motor 48, 248. Because the amount of fluid to the first and second ports 35, 37 is infinitely variable throughout the displacement range of the variable displacement pump 20, variable speed and torque output from the hydro-mechanical transmission 10 to the driven member 16 is possible within a range of from a high equalling the combined speeds of the motor 48, 248 and input 46, 246 to a low equalling the difference between the speeds of the input 46, 246 and motor 48, 248. Depending on speed differential between the motor 48, 248 and input 46, 246, the low speed could result in the direction of rotation of the output shaft 44, 244 being opposite to that of the input 46, 246.

Other aspects, objects and advantages of the present invention can be obtained for a study of the drawings, the disclosure and the appended claims.

I claim:

1. A gearless hydro-mechanical transmission for providing a variable speed and torque output from an external mechanical power source and an external hydraulic power source, comprising:

a stationary case having a first inlet/outlet port and a second inlet/outlet port;

an output shaft mounted within said case for rotation about a central axis;

a mechanical input mounted in coaxial alignment with said output shaft for rotation about said central axis, said input being connected to and rotatable driven by said mechanical power source;

a rotatable hydraulic motor having first and second fluid chambers, and a drive unit for rotatably driving a driven unit, said driven unit being coupled to drive said output shaft; and means for conducting pressurized hydraulic fluid from said hydraulic power source to said hydraulic motor for driving said driven unit of said hydraulic motor by said drive unit, said means including a pressure manifold, an annular port plate, an annular pressure force manifold, a distributor valve, and first and second passage means, said pressure manifold being carried by said case, said port plate being carried by said pressure manifold, said distributor valve being carried by and rotatable with said drive unit of said hydraulic motor, said pressure force manifold being carried within said valve, and said first and second passage means each being separately disposed through said case, pressure manifold, port plate, pressure force manifold and distributor valve to separately conduct fluid from said first and second inlet/outlet ports, respectively, to said first and second chambers of said hydraulic motor.

2. The transmission of claim 1 wherein said port plate has a radially disposed sealing face thereon and said pressure force manifold has a mating radially disposed sealing face thereon disposed in face sealing rotatable contact with said sealing face of said port plate.

3. The transmission of claim 2 wherein said distributor valve has a double stepped annular opening therethrough and said pressure force manifold has a mating double stepped outer periphery that is slidable received within said stepped opening of said valve and provides a pair of pressure chambers therebetween, each chamber being in communication with a respective one of said first and second passage means to create an axial force for urging said sealing face of said pressure force manifold into sealing contact with said face of said port plate.

4. The transmission of claim 3 wherein driven unit has a central opening therethrough, said opening having an internal spline engaged with a mating external spline on said output shaft.

5. The transmission of claim 4 wherein said hydraulic motor is a low speed, high torque type motor.

6. The transmission of claim 5 wherein said hydraulic motor is a radial piston motor and said drive unit is a cam unit and said driven unit is a piston unit.

7. The transmission of claim 4 wherein said hydraulic motor is an axial piston motor and said drive unit is a swash plate unit and said driven unit is a piston unit.

8. The transmission of claim 4 including means for rotatably supporting said hydraulic motor to permit the rotation of said motor relative to said stationary case about said central axis.

* * * * *